Patented Sept. 30, 1924.

1,510,425

UNITED STATES PATENT OFFICE.

WILHELM TRAUBE, OF BERLIN, GERMANY.

PROCESS FOR THE PRODUCTION OF ETHYLESTERS OF HALOGEN SULPHONIC ACIDS.

No Drawing. Application filed June 28, 1920. Serial No. 392,440.

*To all whom it may concern:*

Be it known that I, Professor Dr. WILHELM TRAUBE, citizen of Germany, residing at Berlin, in Prussia, Germany, have invented new and useful Improvements in Processes for the Production of Ethylesters of Halogen Sulphonic Acids, of which the following is a specification.

As is known the isolation of ethylene from gas mixtures, such as coke oven gases, brown coal distillation gases, and similar gases, is extremely difficult, especially on account of the low partial pressure of the ethylene in the gas mixture, and the highly complex character of such gas mixture. The combination of ethylene with concentrated sulfuric acid at ordinary room temperature takes place very slowly as is well known, whereas at considerably higher temperatures, the combination of the ethylene with the sulfuric acid takes place much more readily, but there is considerable carbonization or partial coking of the reacting materials.

I now have found that the said difficulty can be overcome by combining the ethylene in these gases with halogensulphonic acids. This process consists in treating the gases containing ethylene with chlorsulphonic acid. The chlorsulphonic ethyl ester is thus obtained in a very simple manner without the use of catalysers or other precautionary measures. Gas mixtures with a small amount of ethylene can be used because ethylene is absorbed in an even and rapid manner. During this process the reaction masses are suitably cooled. The chlorsulphonic ethyl ester thus produced can be easily decomposed with water into alcohol, hydrochloric acid and sulphuric acid. This decomposition is performed with a less quantity of water than that of ethylsulphuric acid, in consequence of this the expense of distillation is considerably reduced.

Example.—Purified coke-gas, containing in 100 volumes of gas e. g. about two volumes of ethylene, is led through an apparatus which contains liquid chlorsulfonic acid while cooling. The resulting liquid contains about 90 to 100 per cent of chlorsulfonic ethylester.

Instead of chlorsulphonic acid in the same way fluorsulphonic acid can be used, fluorsulphonic ethyl ester being thus obtained which is split up by water in the same way as above.

Having now particularly described and ascertained the nature of my said invention, I declare that what I claim is:—

1. A process for the production of ethylesters of halogen-sulphonic acid by treating this acid with ethylene consisting in bringing into contact with halogensulfonic acid such gases that contain ethylene in a very diluted state only.

2. A process for the production of ethylesters of chlorsulphonic acid by treating this acid with ethylene consisting in bringing into contact with chlorsulfonic acid such gases that contain ethylene in a very dilute state only.

3. A process for the production of ethylesters of chlorsulphonic acid by treating this acid with ethylene consisting in bringing into contact coke-gases with chlorsulfonic acid.

4. A process for the production of ethylesters of halogen-sulphonic acid by treating this acid with ethylene consisting in bringing into contact with halogensulphonic acid while cooling, gases that contain ethylene in a very diluted state only.

5. A process for the production of ethylester of chlorsulphonic acid by treating this acid with ethylene consisting in bringing into contact with chlorsulphonic acid while cooling, gases that contain ethylene in a very diluted state only.

6. A process for quantitively and rapidly absorbing ethylene from gaseous product of destructive distillation of coal, such gases containing a small percentage only of ethylene consisting in treating the said gases with chlorsulphonic acid.

7. A process for quantitively and rapidly absorbing ethylene from gaseous product of destructive distillation of coal, such gases containing a small percentage only of ethylene consisting in treating the said gases with chlorsulphonic acid while cooling.

8. A process for the utilization of the ethylene contained in coal-gases, coke-gases and the like, consisting in converting said ethylene into ethyl chlorsulphonate by treating said gases containing the ethylene with chlorsulphonic acid.

In testimony whereof I have hereunto set my hand in presence of two subscribing witnesses.

Dr. WILHELM TRAUBE.

Witnesses:
 FELIX HEINEMDUM,
 WALTER SCHILL.